(12) United States Patent
Fodor et al.

(10) Patent No.: US 6,437,091 B1
(45) Date of Patent: Aug. 20, 2002

(54) PULSE CONTINUOUS CURING OF POLY (ARYLENE SULFIDE) POLYMERS

(75) Inventors: Jeffrey S. Fodor, Borger, TX (US); Aubrey South, Jr.; Fernando C. Vidaurri, Jr., both of Bartlesville, OK (US)

(73) Assignee: Philips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/476,250

(22) Filed: Dec. 30, 1999

(51) Int. Cl.⁷ .............................. C08J 3/24; C08G 75/14
(52) U.S. Cl. ........................ 528/481; 528/388; 528/483
(58) Field of Search ................................ 528/388, 481, 528/483

(56) References Cited

U.S. PATENT DOCUMENTS

| | | |
|---|---|---|
| 3,524,835 A | 8/1970 | Edmonds et al. |
| 3,717,620 A | 2/1973 | Rohlfing |
| 3,793,256 A | 2/1974 | Scoggin |
| 4,370,471 A | 1/1983 | Salmon ...................... 528/388 |
| 4,532,310 A * | 7/1985 | Christensen |
| 4,839,411 A | 6/1989 | Hoover et al. .............. 524/424 |

FOREIGN PATENT DOCUMENTS

EP 518702 * 12/1992

OTHER PUBLICATIONS

Coulson "Chemical Engineering vol. 3" p. 26–27, Nov. 1979.*
International Search Report in International Application No. PCT/US00/35494.

* cited by examiner

Primary Examiner—David J. Buttner
(74) Attorney, Agent, or Firm—Polly C. Owen

(57) ABSTRACT

A process is provided for curing poly(arylene sulfide) polymers by achieving and maintaining curing conditions in a cure vessel, then intermittently adding uncured polymer to said cure vessel and intermittently removing polymer from the cure vessel wherein the removal of polymer from the cure vessel is performed at intervals such that the presence of uncured polymer is minimized or avoided.

8 Claims, No Drawings

PULSE CONTINUOUS CURING OF POLY (ARYLENE SULFIDE) POLYMERS

FIELD OF THE INVENTION

This invention relates to poly(arylene sulfide), (PAS) polymers. In one aspect this invention relates to a process for the curing of poly(arylene sulfide) polymers by a continuous process wherein removal of cured portions of the polymer is timed so as to minimize or avoid the presence of uncured polymer.

BACKGROUND OF THE INVENTION

Poly(arylene sulfide) polymers are generally known in the art and have been found useful due to their high chemical and thermal resistance. Processes for the preparation of such poly(arylene sulfide) polymers have been disclosed in the art. In a typical preparation, at least one dihaloaromatic compound, a sulfur source, and a polar organic compound are contacted under polymerization conditions. Generally, polymers prepared without the addition of molecular weight modifying agents have been found to be more useful for most applications if the polymer is oxidatively cured prior to use for formulating articles. Such curing processes have primarily been conducted in the industry in a batch process in which the cure time and temperature are specified to achieve the desired final polymer properties. Such batch processes are less desirable in a commercial plant since they can create inefficiencies of operation, i.e., require repeated shut-down and start-up of a process and process vessel and thus limit the throughput of the process. It has been disclosed that the curing process can be conducted continuously, but such a process suffers from lack of flexibility in achieving a variety of final product characteristics, and further provides less desirable final polymer characteristics due to the presence of portions of relatively uncured polymer as well as highly cured polymer. It would be desirable to have a method whereby the polymer could be cured in a continuous process while minimizing uncured polymer and providing flexibility to the operator to achieve desired final polymer product characteristics.

OBJECTS OF THE INVENTION

It is an object of this invention to provide a process for curing a poly(arylene sulfide) polymer in which curing process is conducted on a continuous basis wherein the addition of uncured polymer and removal of cured polymer is coordinated such that little or no uncured polymer is present in the continuous cure vessel during the period of removal of product.

SUMMARY OF THE INVENTION

In accordance with this invention, poly(arylene sulfide) polymers are cured in a process comprising achieving and maintaining curing conditions in a cure vessel, then intermittently adding uncured polymer to said cure vessel and intermittently removing polymer from the cure vessel wherein the removal of polymer from the cure vessel is performed at intervals such that the presence of uncured polymer is minimized or avoided.

DETAILED DESCRIPTION OF THE INVENTION

The poly(arylene sulfide) polymer used in this invention can be prepared by any method known to those of skill in the art. Poly(arylene sulfide) polymerizations are generally disclosed in the art. For example, U.S. Pat. No. 3,354,129, which is hereby incorporated by reference, U.S. Pat. No. 3,919,177, and U.S. Pat. No. 4,645,826 all disclose methods of preparing poly(arylene sulfide) polymers. The above-cited patent publications also disclose methods for recovering a useful poly(arylene sulfide) polymer product. Another suitable method of recovering poly(arylene sulfide) polymer products is disclosed in U.S. Pat. No. 4,415,729, which is hereby incorporated by reference. These patent publications all describe the separation of a desired polymer product from reaction mixtures containing various impurities and unreacted polymerization components. The poly(arylene sulfide) polymer is generally prepared by contacting a polymerization reaction mixture comprising at least one dihaloaromatic compound, a sulfur source, and a polar organic compound under polymerization conditions.

Dihaloaromatic compounds which can be employed include p-dichlorobenzene (DCB), p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl -4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene and the like, and mixtures of any two or more thereof. The preferred dihaloaromatic compound for use in this invention is p-dichlorobenzene (DCB) due to availability and effectiveness.

Any suitable sulfur source can be employed in the process of this invention. Suitable sulfur sources are disclosed in U.S. Pat. No. 3,919,177, which is hereby incorporated by reference. Such suitable sulfur sources include, but are not limited to thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides and hydrogen sulfide. It is presently preferred to use an alkali metal sulfide as the sulfur source.

Alkali metal sulfides which can be employed include lithium sulfide, sodium sulfide, potassium sulfide, rubidium sulfide, cesium sulfide, and mixtures thereof. Preferably, the alkali metal sulfide is used as a hydrate or as an aqueous mixture. If desired, the alkali metal sulfide can be prepared as an aqueous solution by the reaction of an alkali metal hydroxide with an alkali metal bisulfide in aqueous solution. It is preferred to use sodium sulfide or a combination of sodium bisulfide and sodium hydroxide as the sulfur source in this invention.

The polar organic compounds useful are solvents for the dihaloaromatic compounds and the sulfur source used in the production of poly(arylene sulfide) polymers. Examples of such polar organic compounds include amides, including lactams, and sulfones. Specific examples of such polar organic compounds include hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N'-dimethylacetamide, 1,3-dimethyl-2-imidazolidinone, low molecular weight polyamides, and the like. The polar organic compound presently preferred is NMP.

It is within the scope of this invention to employ poly (arylene sulfide) polymers that have been produced using other components in the polymerization reaction mixture or during the polymerization. For example, molecular weight modifying or enhancing agents such as alkali metal carboxylates, lithium halides, or water can be added or produced during polymerization. Suitable alkali metal carboxylates which can be employed include those having the formula R'COOM where R' is a hydrocarbyl radical selected from alkyl, cycloalkyl, aryl, alkylaryl, arylalkyl, and the number of carbon atoms in R' is in the range of 1 to about 20, and M is an alkali metal selected from lithium, sodium, potassium, rubidium and cesium. The alkali metal carboxylate can be employed as a hydrate or as a solution or dispersion in water. The preferred alkali metal carboxylate is sodium acetate due to availability and effectiveness.

The uncured poly(arylene sulfide) polymers that are cured according to this invention will generally comprise relatively low molecular weight poly(arylene sulfide) polymers; however, the invention process can also be used to cure relatively high molecular weight polymers.

The term low molecular weight poly(arylene sulfide) polymer is generally meant to denote a poly(arylene sulfide) polymer having a melt flow value in the range of greater than 1000 g/10 min. to about 30,000 g/10 min. when measured according to ASTM D 1238, Condition 316/5.

The term high molecular weight poly(arylene sulfide) polymer, as used herein, is generally meant to denote an essentially linear poly(arylene sulfide) polymer having a melt flow value less than about 1000 g/10 min when in an uncured state. Essentially linear poly(arylene sulfide), as used herein, is defined as a polymer having no branching or such a small amount of branching as to have substantially no effect on the polymer properties. For example, the amount of polyhaloaromatic impurity found in the dihaloaromatic used in the poly(arylene sulfide) polymerization process would not be sufficient to cause the resultant poly(arylene sulfide) to be outside the essentially linear definition).

Generally, the ratio of reactants employed in the polymerization process can vary widely. It is preferred that the molar ratio of the amount of dihaloaromatic compound to amount of sulfur source be in the range of about 0.8/1 to about 2/1. If an alkali metal carboxylate is employed as a molecular weight modifying agent, it is preferred that the molar ratio of alkali metal carboxylate to dihaloaromatic compound be within the range of about 0.05/1 to about 4/1.

The amount of polar organic compound employed can vary during the polymerization over a wide range. Preferably, however, during polymerization the molar ratio of the amount of polar organic compound to the range of sulfur source is in the range of 1/1 to 10/1.

The components of the reaction mixture can be contacted with each other in any order.

The term termination of polymerization, as used herein, is defined as that point at which an affirmative step is taken to effect a removal of the conditions necessary for polymerization to effectively continue, for example, by beginning the recovery of the poly(arylene sulfide) polymer from the polymerization mixture. It must be noted that use of the term termination of the polymerization does not imply that complete reaction of the polymerization reaction components has occurred. It should also be noted that, as used herein, the term termination of the polymerization is not meant to imply that no further polymerization of the reactants can take place. Generally, for economic reasons, poly(arylene sulfide) polymer recovery is typically begun at a time when polymerization is substantially completed, that is, the increase in polymer molecular weight which would result from further polymerization is not significant enough to warrant the additional polymerization time.

Although the reaction temperature at which the polymerization is conducted can vary over a wide range, generally it will be within the range of about 170° C. (347° F.) to about 325° C. (617° F.), preferably about 200° C. to about 290° C. The reaction time can vary widely, depending in part on the reaction temperature, but generally will be within the range of about 10 minutes to about 72 hours, preferably about 1 hour to about 8 hours. The pressure should be sufficient to maintain the polar organic compound and the dihaloaromatic compound substantially in the liquid phase.

The poly(arylene sulfide) polymer prepared according to this invention can be recovered by any method known to those of ordinary skill in the art.

According to this invention, the poly(arylene sulfide) polymers are cured to increase the molecular weight of the polymers and thus achieve desired final product polymer characteristics.

The curing process involves heating the polymer either below or above its melting point for a period of time sufficient to achieve the desired mechanical properties of the polymer product. The poly(arylene sulfide) polymers treated according to this invention can have melting temperatures ranging from around room temperature to above 400° C. Accordingly, the curing process temperature can vary over a wide range, it will generally be from about 100 to about 350° C. It is preferred to cure the polymer at temperatures in the range of about 150 to about 275° C. The pressure at which the curing process is conducted will range from slightly below atmospheric pressure up to about 30 psig. The curing process can take place in the presence of oxygen or an oxidizing agent, can be conducted under an inert gas such as nitrogen, or can be treated in a combination process where a portion of the curing process is conducted in the presence of oxygen and the remainder of the process is carried out under an inert gas.

The amount of time required to cure the polymers will vary based upon the conditions of temperature, pressure, atmosphere under which the curing process is conducted and desired final characteristics of the polymer, but will generally range from about 1 hour to about 200 hours. According to the invention process, a portion of the polymer is removed from the cure vessel at a time when the amount of uncured polymer within the cure vessel is minimized. The time interval between the addition of uncured polymer and removal of the porion of polymer having a minimum amount of uncured material will also depend upon the temperature, pressure, atmosphere, and desired properties of the final product. It is preferred to use a time interval in the range of about 15 minutes to about 15 hours when treating a low molecular weight poly(arylene sulfide) polymer. The time interval can be selected to be shorter when treating a high molecular weight polymer and a preferred range is about 10 minutes to about 10 hours. Use of the invention pulse continuous curing process allows one to avoid the period required to charge the cure vessel and remove cured polymer between batches which periods each can range from 3 hours to 8 hours, dependent upon vessel size.

The curing process can be conducted in conventional closed vessels which can be run at the appropriate temperatures, pressures and having necessary features for proper mixing of the polymer. According to this invention, the cure vessel is selected so as to be capable of continuous operation. It is presently preferred to conduct the curing process of this invention in a continuous stirred tank reactor. It is preferred to feed the uncured polymer to the cure vessel by equipment intended to pre-heat and meter the feed into the cure vessel in order to allow the cure vessel conditions to remain as constant as possible.

The following examples are provided in order to further illustrate the invention, but are not intended to be limiting of the scope thereof.

EXAMPLES

In the following examples, the polymer 1270 extrusion rates, reported as grams per 10 minutes (g/10 min), were determined by the method of ASTM D 1238, Condition 316/0.345. The orifice used for measuring the 1270 extrusion rate had a 2.096+/−0.005 mm diameter and a 31.75+/−0.05 mm length. Polymer melt flow values, in units of g/10 min, were determined by the method of ASTM D 1238, Condition 316/5. The orifice used for measuring the melt flow had a 2.096+/−0.005 mm diameter and a 8.000+/−0.025 mm length. Polymer 1270 extrusion rate values, in units of 3/10 minutes were determined by the method of ASTM D1238, condition 316/1.270. The orifice used for measuring the 1270 extrusion rate had a 2.096±0.005 mm diameter and a 31.75±0.05 mm length.

The relative amounts of volatiles present in the polymer samples were measured using a quartz crystal microbalance (QCM). This test involved vaporizing volatile materials from a molten PPS sample, collecting the vapors on a water cooled, vibrating quartz crystal, and comparing the amount of condensed material by changes in the frequency of the vibrating crystal. A weighed sample of the PPS polymer was placed in the bottom of a heated (325° C.) stainless steel beaker that was covered with a lid containing the vibrating crystal. As the vapors condensed on the crystal, the resonance frequency of the crystal decreased in proportion to the amount deposited. Test values are reported in terms of a dimensionless relative number proportional to the change in frequency of the crystal in a 10 minute test time. Lower reported values indicate that the test sample had a lower level of volatiles at the test temperature than the samples with higher QCM values.

The unannealed and annealed tensile strengths of each sample were determined according to ASTM D638. The flexural modulus and flexural strengths of each sample were determined by the method of ASTM D790. The unnotched izod and notched izod impact strengths of each sample were determined by the procedure of ASTM D256.

Example I

All curing processes were conducted in a rectangular trough with an approximately 5.875 inch radius hemicylindrical bottom, having dimensions as follows: 35.5 inches long, 11.75 inches wide, and 8.5 inches deep to the beginning of the hemi-cylindrical bottom, giving a total depth of 14.375 inches.

The poly(phenylene sulfide) polymers used in this example and invention Example II was an acid washed, high molecular weight polymer prepared according to the method disclosed in U.S. Pat. No. 3,919,177 and available from Phillips Petroleum Company under the designation PR26. The uncured polymer used in Runs I-1, II-1 and II-2 had a 1270 extrusion rate of 38.4 g/10 min., a QCM value of 7.14, and a bulk density of 20.3 lb/cu. ft.; the polymer used in Runs I-2 and II-3 had a 1270 extrusion rate of 36.2 g/10 min., a QCM value of 9.48 and a bulk density of 22.1 lb/cu.ft.

For Run I-1, the polymer was charged to the cure vessel, was cured at temperatures ranging from 350–370° F. for approximately 11 hours, then was removed from the cure vessel.

For Run I-2, the polymer was charged to the cure vessel, was cured at temperatures ranging from 300–355° F. for approximately 7.5 hours, then was removed from the cure vessel.

Example II

This example describes the effect of employing the invention method of curing the polymer according to a pulsed continuous process.

For Run II-1, the polymer was charged to the cure vessel over a period of about 5 hours, and the temperature of the cure vessel and contents was raised to a specified set point. Upon reaching the set point, a measured amount of cured polymer was discharged from the vessel, and immediately following the discharge, an equal amount of uncured polymer was charged to the cure vessel. This discharge, feeding schedule was repeated at set intervals until the 1270 extrusion rate of the discharged polymer reached a steady value. Feeding and discharge of approximately four liters of polymer was accomplished using a calibrated container. Since the uncured polymer that was fed to the cure vessel was not pre-heated, a temperature drop of around 50° F. occurred each time the uncured polymer was fed to the cure vessel; the temperature increased to the set point within 10 minutes each time after introduction of the uncured polymer. The intervals between removal of the polymer were set at 1.5 hours, and a vessel temperature was measured every 0.5 hrs. The set point temperature of the cure vessel was 425° F. Curing was conducted over a period of about 18 hours.

Run II-2 was performed in a manner identical to Run II-1 except that the cure vessel set point was 390° F., but later drifted to about 360° F. Curing was conducted over a period of about 27 hours.

Run II-3 was performed in a manner identical to Run II-2 except that the polymer used came from the same product lot as that used for Example I, Run I-2 and that the temperature set point drifted between 350° and 400° F., due partly, it is believed, to the fact that the size of the discharge and feed was varied from interval to interval over the course of the curing process. The curing process was continued for a period of 59 hours.

A comparison of the curing processes and resulting cured polymer properties from Example 1 and Example II is shown in Table I hereinbelow. The polymers cured by the invention method have comparable 1270 extrusion rates to those cured according to known batch curing processes; however, use of the invention method of pulsed continuous curing allows the operator to achieve higher throughputs and maximize polymer production.

TABLE I

| Run No. | Cure Type | Cure Tem (F.) | Cure Time (hrs) | Extrusion Rate (g/10 min.) | QCM Value |
|---|---|---|---|---|---|
| I-1 | Batch | 350–370 | 11 | 20.5 | 3.4 |
| I-2 | Batch | 300–355 | 7.5 | 25.8 | 5.8 |
| II-1 | Pulse | 425 | 18 | 5.7 | 2.0 |
| II-2 | Pulse | 360–400 | 27 | 17.9 | 3.4 |
| II-3 | Pulse | 350–400 | 59 | 18.8 | 3.3 |

Example III

The polymers produced in Examples I and II were used to form compounds which were then molded into samples in order to test mechanical properties. Compounds were prepared by tumble blending mixtures of PPS powder, glass fiber and additives in a plastic bag. The fiberglass and additives were selected from G-filament fiberglass, in this example OC497EE supplied by Owens-Corning; an epoxysilane, in this example gamma-glycidoxypropyltrimethoxysilane available from Union Carbide as TC-100; a hydrotalcite, in this example DHT-4A supplied by Kiowa Chemical Industry; a polyetheretherketone, in this example 380 P supplied by ICI; and a high density polyethylene, in this example TR-161 supplied by Phillips Chemical Company. This dry blend was then melt mixed in a 1.5-inch, 24:1 (L:D), Davis-Standard, single screw extruder at temperature settings of 620°–620° F. Extrudate was chopped and then molded into test specimens using an Arburg ECO 305 injection molder using procedures known to those skilled in the art. All samples were annealed for two hours at 392° F. before testing. Mechanical properties were determined using ASTM procedures D638 and 790. The properties were compared to a commercial product having a similar composition sold by Phillips Petroleum Company under the designation R-4XT prepared from a polymer produced in the manner described in Example I. The results are shown below in Table II. As can be seen in Table II, the mechanical properties are comparable for the compounds prepared from the polmers cured by conventional batch processes and by the invention pulse continuous curing process. The pulse continuous curing process allows the operator to maximize production by avoiding the initial charging and final removal periods for each batch to be cured.

TABLE II

| Cmpd. from Polymer Run | Notch Izod ftlb/in | Unnotch Izod ftlb/in | Ten Mod Ksi | Ten Break Ksi | Flex Mod Ksi | Flex Str Ksi | QCM Value |
|---|---|---|---|---|---|---|---|
| II-1 (inv.) | 1.31 | 13.2 | 2310 | 25.4 | 2000 | 40.6 | 1.31 |
| II-2 (inv.) | 1.39 | 12.8 | 2280 | 27.5 | 2020 | 41.4 | 1.42 |
| I-1 | 1.38 | 13.8 | 2250 | 27.4 | 2040 | 40.4 | 1.20 |
| II-3 (inv.) | 1.38 | 13.3 | 2340 | 28.4 | 2030 | 39.5 | 1.97 |
| I-2 | 1.35 | 11.3 | 2400 | 24.8 | 2030 | 38.8 | 2.39 |
| R-4XT | 1.50 | 13.6 | 2500 | 27.8 | 2100 | 40.4 | 1.85 |

While this invention has been described in detail for the purpose of illustration, it is not meant to be limited thereby, but is intended to cover all reasonable modifications within the scope thereof.

That which is claimed is:

1. A process for curing a poly(arylene sulfide) polymer which comprises:

(a) achieving and maintaining in a single cure vessel curing conditions sufficient to cause a poly(arylene sulfide) polymer to undergo a decrease in extrusion rates while intermittently adding to said single cure vessel a portion of uncured polymer and removing a portion of polymer where said removal of said portion of polymer is performed at intermittent intervals such that the extrusion rate of said portion of polymer that is removed reaches a steady value and said portion is less than the entire polymer content of the single cure vessel.

2. A process according to claim 1 wherein said curing conditions comprise a temperature in the range of about 100 to about 350° C.

3. A process according to claim 1 wherein said curing conditions comprise a pressure in the range of about 10 to about 45 psia.

4. A process according to claim 1 wherein said curing is conducted in an oxygen containing atmosphere.

5. A process according to claim 1 wherein said curing is conducted in an inert atmosphere.

6. A process according to claim 1 wherein said curing is conducted for a period in an oxygen containing atmosphere, followed by curing under an inert gas.

7. A process according to claim 1 wherein the cure vessel is a continuous stirred tank reactor.

8. A process according to claim 1 wherein the portion of polymer is removed after an interval in the range of 0.1 hours to 15 hours after uncured polymer is added to the cure vessel.

* * * * *